C. Roberts.
Harvester & Thresher.

№ 19447. Patented Feb. 23, 1858.

UNITED STATES PATENT OFFICE.

CHARLES ROBERTS, OF LIVONIA, NEW YORK.

IMPROVEMENT IN HARVESTERS.

Specification forming part of Letters Patent No. 19,447, dated February 23, 1858.

*To all whom it may concern:*

Be it known that I, CHARLES ROBERTS, of Livonia, in the county of Livingston and State of New York, have invented a new and Improved Harvester; and I do hereby declare that the following is a full, clear, and exact description of the same, reference being had to the annexed drawings, making a part of this specification, in which—

Figure 1:
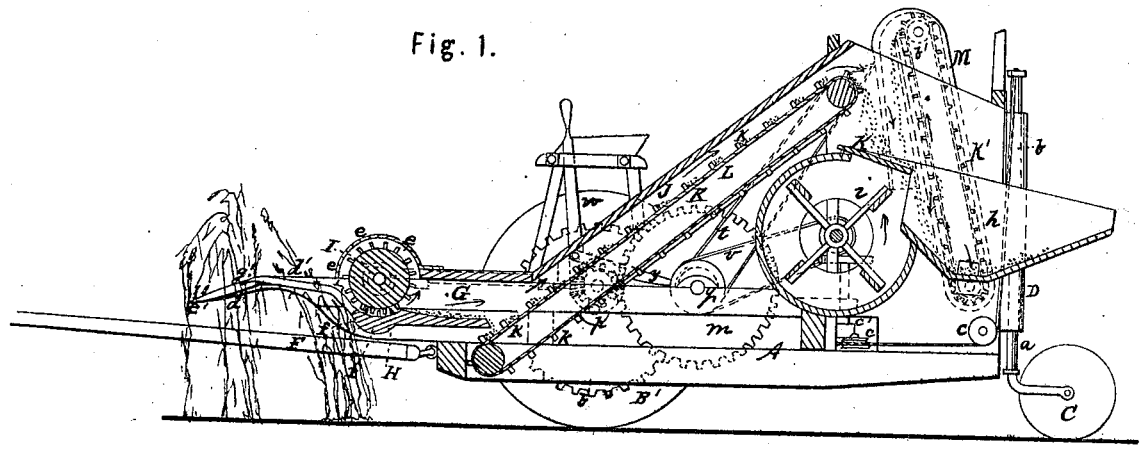
Figure 2:
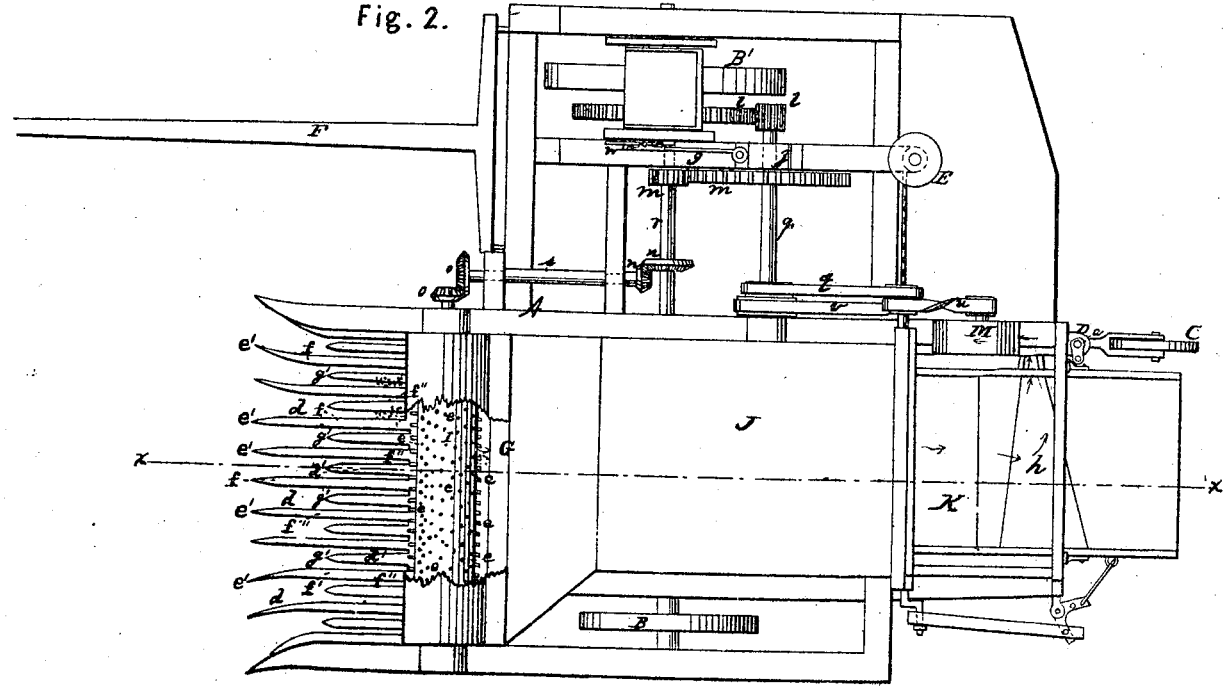

Figure 1 is a longitudinal vertical section of my improvement, taken on the line *x x*, Fig. 2. Fig. 2 is a plan or top view of the same.

Similar letters of reference indicate corresponding parts in the two figures.

This invention relates to an improvement in that class of harvesters by which the grain only is harvested, the straw being allowed to remain standing in the field.

The invention consists in the peculiar means employed for detaching the grain from the straw, and also in the means used for properly presenting the grain to the detaching device.

The invention also consists in using in connection with the above parts certain means for cleaning the grain or separating it from foreign substances, the several parts working simultaneously.

To enable those skilled in the art to fully understand and construct my invention, I will proceed to describe it.

A represents a horizontal frame, the front end of which is supported by two wheels, B B', the back end being supported by a swivel or caster wheel, C, the rod or support *a* of which is fitted within a tube, D, at the back part of the frame. The upper end of the rod *a* has a cord or chain, *b*, attached to it, said cord passing around pulleys *c*, and attached to a windlass, E, on the frame, by operating which the back and consequently the front end of the frame A may be raised or lowered to the desired height.

To one end of the front part of the frame A a draft-pole, F, is attached, and to the adjoining or opposite end a series of fingers, *d d'*, are attached. The portion of the frame to which the cutters are attached is slightly elevated above the other part, and it extends a trifle farther forward, as shown in Fig. 2. The fingers *d d'* are attached directly in front of a box, G, having a toothed concave, H, at its front end. The box G and toothed concave H extend the whole width of the elevated portion of the frame, and a cylinder, I, is placed in the front part of the box G, said cylinder having teeth *e* in its periphery. The teeth *e* are placed in parallel rows longitudinally on the cylinder, and as the cylinder rotates pass between the teeth *f* of the concave H. The cylinder I projects over the inner ends of the fingers *d d'*, as shown clearly in Fig. 1, and the cylinder is covered by a cap. The fingers *d d'* are of bent form, and the fingers *d* are considerably longer than the fingers *d'*, every alternate finger being long and the intermediate ones short. (See Fig. 2.) The long fingers *d* are bent or inclined downward at their front ends, as shown at *e'* in Fig. 1. The other portions, *f'*, are somewhat inclined in an opposite direction, and the inner parts, *f'''*, are inclined rather more than the parts *f'*, but in the same direction. The short fingers *d'* are bent in the same form as the long fingers *d*; but their outer inclined ends, *g'*, do not extend down as far as the ends *e'* of the fingers *d*. (See Fig. 1.)

J is an inclined box or case, the lower end of which is connected to the back end of the box G, the upper end being connected with a separating device, K, the separating device being formed of a shoe, *h*, provided with the usual screens and a fan, *i*. The separating device is placed on the back part of the frame A, and does not differ essentially from those in ordinary use. Within the box or case J an endless apron, L, is placed. This apron works around rollers *l l*, and has slots *k* attached transversely to it. The apron L serves the office of an elevator, as will be presently shown.

To one side of the separator K a trough, M, is attached, and this trough is provided with elevators *k'*, constructed in the usual way—viz., by having buckets attached to an endless strap.

The cylinder I is rotated from the wheel B' by means of gearing *l m n o*, placed on shafts *p q r s*, as shown in Fig. 2.

The apron L is operated by a belt, *t*, from shaft *q*, and the elevators *k'* are operated by a cross-belt, *u*, from the axis of the upper roller, *j*, of the apron L. The fan *i* is rotated by a belt, *v*, from the shaft *q*.

The gear-wheels *l l* may be thrown out of gear at any time by operating a lever, *w*, which is connected by a rod, *y*, with a bearing, *z*, of shaft *q*.

The operation is as follows: As the machine is drawn along, the fingers *d d'* pass between the straws just below the heads containing the grain, and the grain is detached from the heads, as the latter touch the front edge of concave H, by the teeth *e* of the cylinder I; and if any heads are detached from the straw by the action of the cylinder the grain will be thrashed therefrom as they pass between the cylinder and concave. The grain is carried up into the separator K by the apron L, and is winnowed therein, the clean grain passing into the lower end of the trough M, and the elevators *k'* carrying it up and discharging it into a bag or other receptacle placed below the upper end of the trough M. The fingers *d d'* are raised or lowered to the desired height by operating the windlass E, as previously described. The ends *e' g'* of the fingers *d d'* serve to elevate the lodged straw, or that which is not quite erect, and causes it all to be presented to the cylinder I. Were the fingers perfectly straight, all lodged straw would escape them, and consequently much grain would be lost.

I do not claim separately the separator K, for that is in common use; nor do I claim broadly a toothed cylinder and concave, irrespective of the arrangement herein shown and described; but,

Having thus described my invention, what I claim as new, and desire to secure by Letters Patent, is—

The arrangement and combination of the peculiarly-curved teeth *d d'*, concave H, elevator L, separator K, and elevator M, as and for the purposes herein set forth.

CHARLES ROBERTS.

Witnesses:
S. N. CHAMBERLIN,
C. H. CHAMBERLIN.